United States Patent [19]
Eyerly

[11] Patent Number: 6,118,246
[45] Date of Patent: Sep. 12, 2000

[54] PHASE SYNCHRONIZATION OF REDUNDANT MOTOR WINDINGS

[75] Inventor: Bruce N. Eyerly, Torrance, Calif.

[73] Assignee: Hughes Electronics Corporation, El Segundo, Calif.

[21] Appl. No.: 09/375,821

[22] Filed: Aug. 16, 1999

[51] Int. Cl.[7] ................................................. G05B 1/06
[52] U.S. Cl. ........................ 318/696; 318/685; 318/560; 318/652
[58] Field of Search ................................ 318/30–90, 245, 318/254, 138, 560–696, 759; 363/65, 71

[56] References Cited

U.S. PATENT DOCUMENTS

| | | | |
|---|---|---|---|
| 4,349,772 | 9/1982 | Weiss ....................................... | 318/799 |
| 5,936,370 | 8/1999 | Fukao et al. ............................. | 318/652 |
| 5,990,651 | 11/1999 | Iwazawa et al. ........................ | 318/685 |
| 6,014,003 | 1/2000 | French ..................................... | 318/701 |

*Primary Examiner*—Paul Ip
*Attorney, Agent, or Firm*—Terje Gudmestad; M. W. Sales

[57] ABSTRACT

A method and system (10) for simultaneous operation of primary (14A–14D) and redundant (16A–16D) motor windings in a redundant stepper motor (12). The redundant motor system (10) has a control circuit (11) including a phase synchronizer (36) for establishing a relationship between predetermined primary and redundant motor windings (14A–14D and 16A–16D) such that the power consumption is increased and the motor torque is affected. In one embodiment of the present invention the predetermined motor windings (14A–14D and 16A–16D) are operated in phase thereby doubling the power consumption and increasing the torque. In another embodiment, the predetermined motor windings (14A–14D and 16A–16D) are operated in phase quadrature thereby doubling the power consumption and increasing the torque by less than 50%. In yet another embodiment, the predetermined motor windings (14A–14D and 16A–16D) are operated out of phase with each other thereby doubling power consumption and producing zero torque.

12 Claims, 2 Drawing Sheets

PHASE SYNCHRONIZATION OF REDUNDANT MOTOR WINDINGS

GOVERNMENT INTEREST

This invention was made with government support. The Government has certain rights in this invention.

TECHNICAL FIELD

The present invention relates to a motor system having redundant motor windings and more particularly to a system and method for manipulating motor power and motor torque for a motor system having redundant motor windings.

BACKGROUND ART

A stepper motor is an electromagnetic device that converts a series of input power pulses, or steps, into discrete angular movements. The sequential power pulses are delivered successively to different windings in the motor.

For enhanced reliability, stepper motors may have redundant motor windings and drive electronics. A redundant stepper motor has primary motor windings and redundant motor windings. Each set of windings has drive electronics associated therewith. The redundant motor windings and drive electronics provide a backup to the primary windings and drive electronics in the event of a failure.

It is common practice to design a motor system with excess torque capability to handle unforeseen failures or degradation in the system the motor is driving. In applications of redundant motor systems, this practice results in large, heavy, expensive motor systems. Essentially, a redundant motor system has double the components. In practice, the components are usually sized larger than necessary to account for unforeseen obstacles or load requirements that may occur, yet these redundant systems are essentially unused unless a failure occurs.

SUMMARY OF THE INVENTION

The present invention is a system and a method for increasing power consumption, and in some instances, motor torque, through simultaneous operation of primary and redundant motor windings and drive electronics in a redundant stepper motor system. The present invention operates predetermined primary and redundant motor windings simultaneously and establishes a phase relationship to combine the torque produced by the windings. The power consumption is increased independent of the phase relationship between the predetermined motor windings. The phase relationship between windings is in phase to increase the torque, and out of phase to effect zero torque.

Several combinations of the primary and redundant motor windings are possible depending on the desired outcome. Operating the primary and redundant motor windings in phase with one another will double the motor torque and power consumption. This application may be used to overcome an obstruction or other high torque load.

Operating the primary and redundant motor windings in a phase quadrature relationship will double the power consumption, and increase the torque by less than 50%. This arrangement is useful for applications where increased motor torque is needed, but there is a concern of damage to the system components if the torque is doubled.

Operating the primary and redundant windings out of phase will double the power consumption and result in zero torque. This mode of operation is useful for generating heat to a motor, or its surroundings, without producing torque. For example, in case of a faulty thermal control system, this technique will generate heat without causing motor wear. It is also possible to elevate the temperature of a motor to overcome an obstruction without inducing the cyclic wear that results from a jammed motor that continues to produce torque.

It is an object of the present invention to enhance the utility of redundant stepper motor drive systems. It is another object of the present invention to provide additional power consumption and motor torque through simultaneous operation of primary and redundant drive circuits.

It is a further object of the present invention to provide heat to the motor system without inducing torque through simultaneous operation of predetermined primary and redundant motor windings out of phase with each other.

Other objects and features of the present invention will become apparent when viewed in light of the detailed description of the preferred embodiment when taken in conjunction with the attached drawings and appended claims.

BRIEF DESCRIPTION OF THE DRAWINGS

In order that the invention may be well understood, there will now be described some embodiments thereof, given by way of example, reference being made to the accompanying drawings, in which.

BEST MODE(S) FOR CARRYING OUT THE INVENTION

Figure 1:
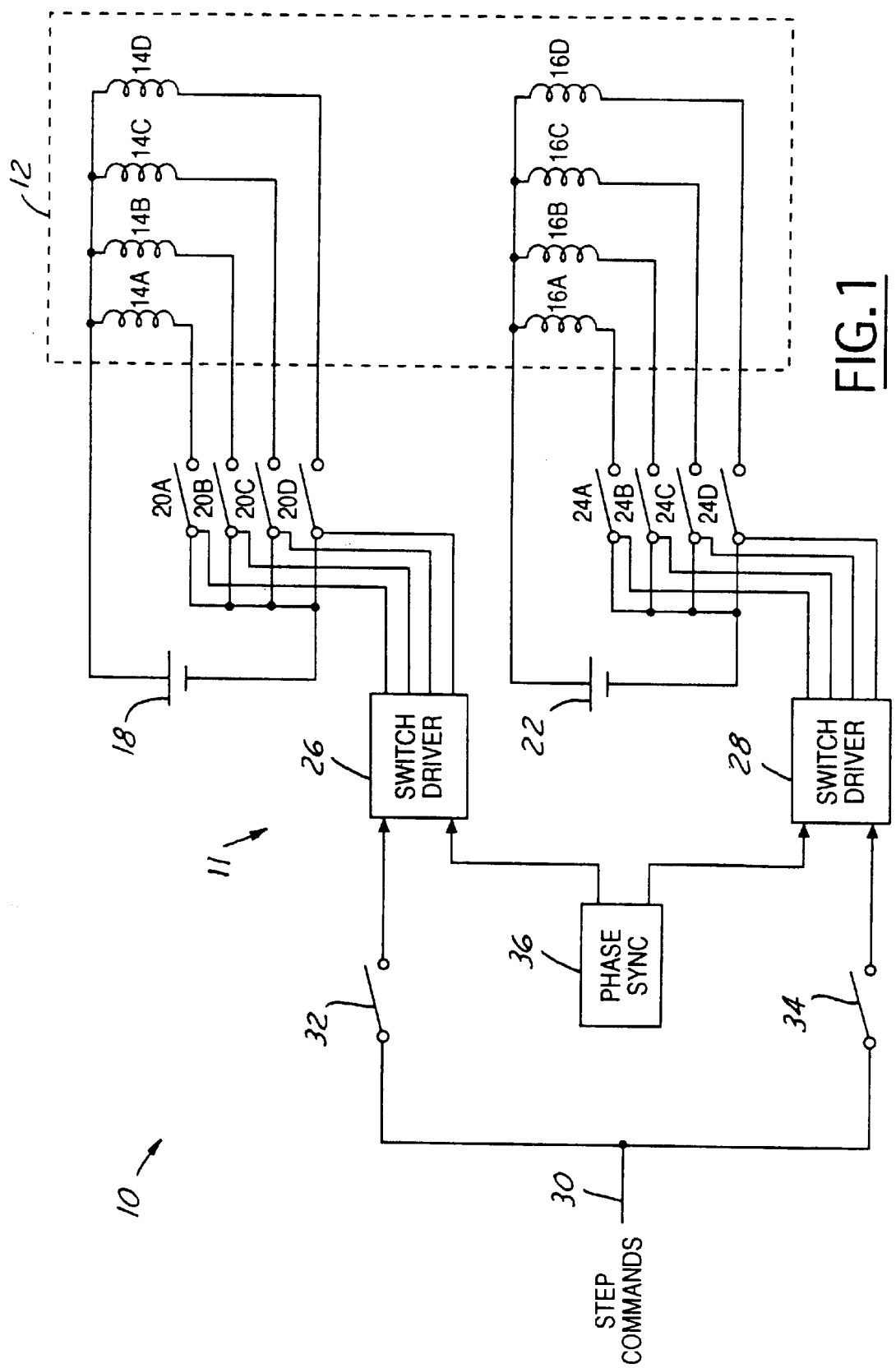
FIG. 1 is a schematic diagram of the motor drive circuit of the present invention.

FIG. 1 is a schematic diagram of the redundant stepper motor system 10 including a control circuit 11 of the present invention. A redundant stepper motor 12, having four primary motor windings 14A, 14B, 14C, and 14D and four redundant motor windings 16A, 16B, 16C and 16D, produces motor torque when each motor winding is energized. The torque varies sinusoidally as a function of the angular position of the motor's rotor (not shown). In a typical stepper motor, the torque produced in each winding is in quadrature to its neighbors. Therefore, by energizing each winding in sequence, the motor can be made to rotate.

In the redundant stepper motor control system 10 of the present invention, a primary voltage source 18 is connected to the primary motor windings 14A–14D through a set of power switches 20A–20D. A redundant voltage source 22 is connected to the redundant motor windings 16A–16D through a set of power switches 24A–24D. A switch driver 26 controls the operation of the power switches 20A–20D for the primary motor windings 14A–14D. A separate switch driver 28 controls the operation of the redundant motor windings 16A–16D through the associated set of power switches 24A–24D.

The switch drivers 26 and 28 receive step rate and step direction commands from a step command source 30. The step commands are routed by way of a primary routing switch 32 connected to the switch driver 26 for the primary motor windings 14A–14D and a redundant routing switch 34 connected to the switch driver 28 for the redundant motor windings 16A–16D. When the primary routing switch 32 is closed, the primary motor drive circuit is active and when the redundant routing switch 34 is closed, the redundant motor drive circuit is active.

A phase synchronizer 36 establishes the operating conditions for the motor control circuit 11. The phase synchronizer 36 controls the configuration of the switch drivers 26 and 28 and which of the switches associated with each driver will be closed upon receipt of the step commands from the step command source 30.

In the motor control circuit 11 of the present invention, switches 32 and 34 are both closed and the primary and redundant motor windings are operated simultaneously. The phase synchronizer 36 controls the phase relationship between the switch drivers 26 and 28. Manipulation of the phase relationship between the switch drivers while the primary and redundant motor circuits are active simultaneously allows control of motor torque and power consumption.

With the primary and redundant motor windings energized simultaneously the motor power is doubled. For primary and redundant windings in phase with each other, i.e. 14A and 16A or 14A and 16B, the motor torque produced by each will be combined. This allows the redundant motor system to provide backup to the primary motor system by providing extra torque in situations where it is demanded. Because the motors are operated simultaneously to achieve the extra torque required, the motors do not need to be oversized. Therefore, the motor system is lighter and less expensive than prior art redundant motor systems that operate the primary and redundant motors one at a time.

In one method of the present invention, the primary and redundant motor windings are synchronized in phase with one another. For example, energizing primary motor winding 14A and redundant motor winding 16A in phase results in the motor torque and power consumption being doubled. It should be noted that, depending on the particular motor design, the magnetic circuit of the motor might saturate resulting in less than a doubling of torque.

Figure 2:
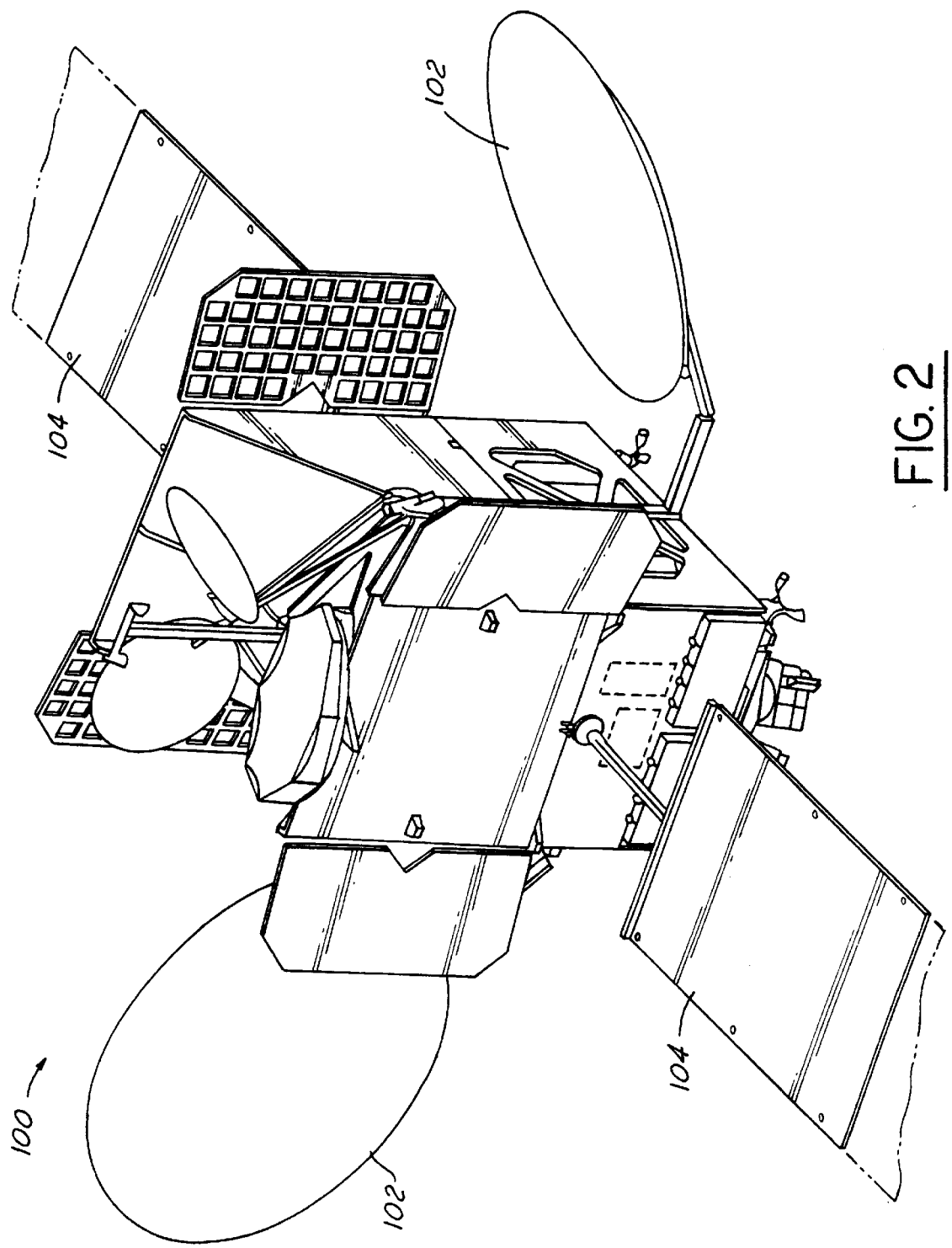
FIG. 2 is a satellite system including the motor drive circuit of the present invention.

Simultaneous operation of primary and redundant motor windings in phase is particularly advantageous in applications requiring a high torque load. For example, when it is necessary to overcome an obstruction in motors used in satellite applications. FIG. 2 is an example of a satellite system 100 that uses redundant stepper motors (not shown). For example, redundant stepper motors may be used to effect movement of the antennas (102) and the solar arrays (104). It should be noted that FIG. 2 is only an example and is not intended to limit the present invention.

In another method of the present invention, the primary and redundant motor windings are operated in phase quadrature with each other. For example, referring back to FIG. 1, phase quadrature is achieved by energizing primary winding 14A and redundant winding 16B simultaneously. The motor power consumption is doubled, and the torque is increased by less than 50%. This method is particularly advantageous for applications where it is necessary to overcome a high torque load, but too much torque could potentially cause damage.

In yet another method of the present invention, the primary and redundant windings are operated out of phase with each other. For example, energizing primary winding 14A and redundant winding 16C simultaneously will produce double the motor power, yet the motor torque will be zero. This method generates heat without moving the motor, so an application requiring heat to the motor or its surroundings would benefit from this mode of operation. For example, a failure in a thermal control system on a satellite would benefit from this mode of operation. It is also possible to elevate the temperature of a jammed motor to overcome an obstacle without inducing the cyclic wear that results from a motor that continues to produce torque while jammed.

While particular embodiments of the invention have been shown and described, numerous variations and alternate embodiments will occur to those skilled in the art. Accordingly, it is intended that the invention be limited only in terms of the appended claims.

What is claimed is:

1. A motor control circuit for a redundant stepper motor comprising:

a set of primary motor windings;

a primary voltage source;

a first set of power switches connecting said primary voltage source to said primary motor windings, each switch in said first set of power switches being connected to a respective primary motor winding in said set of primary motor windings;

a first switch driver connected to said first set of power switches;

a set of redundant motor windings;

a redundant voltage source;

a second set of power switches connecting said redundant voltage source to said set of redundant motor windings, each switch in said second set of power switches being connected to a respective redundant motor winding in said set of redundant motor windings;

a second switch driver connected to said second set of power switches;

a step command source connected to said first and second switch drivers; and a first routing switch for controlling the delivery of step commands from said step command source to said first switch driver;

a second routing switch for controlling the delivery of step commands from said step command source to said second switch driver; and a phase synchronizer connected to said first switch driver and said second switch driver for controlling simultaneous operation of said primary and redundant motor windings.

2. The motor control circuit as claimed in claim 1 wherein said phase synchronizer is set to establish a relationship between predetermined primary and redundant motor windings such that they operate in phase with each other thereby doubling power consumption and increasing motor torque.

3. The motor control circuit as claimed in claim 1 wherein said phase synchronizer is set to establish a relationship between predetermined primary and redundant motor windings such that said predetermined motor windings operate in phase quadrature thereby doubling power consumption and increasing motor torque by less than 50%.

4. The motor control circuit as claimed in claim 1 wherein said phase synchronizer is set to establish a relationship between predetermined primary and redundant motor windings such that said predetermined windings operate out of phase with each other thereby doubling power consumption and producing zero torque.

5. A method for simultaneous operation of primary and redundant motor windings in a redundant stepper motor system having a set of primary motor windings, a set of redundant motor windings, a set of power switches for each set of motor windings, a switch driver for each set of power switches, a routing switch for each switch driver, and a phase synchronizer, said method comprising the steps of:

closing both routing switches in said redundant stepper motor system;

initializing a first switch driver to energize predetermined windings of said primary motor windings;

initializing a second switch driver to energize predetermined windings of said redundant motor windings;

establishing a phase relationship between said primary and redundant motor windings;

whereby said motor torque and power consumption are determined by said phase relationship of said energized motor windings.

6. The method as claimed in claim 5 wherein said step of establishing a phase relationship between said energized motor windings further comprises synchronizing said energized motor windings in phase thereby doubling power consumption and increasing motor torque.

7. The method as claimed in claim 5 wherein said step of establishing a phase relationship between said energized motor windings further comprises energizing said primary and redundant motor windings in phase quadrature thereby doubling power consumption and increasing motor torque by less than 50%.

8. The method as claimed in claim 5 wherein said step of establishing a phase relationship between said energized motor windings further comprises operating said energized motor windings out of phase thereby doubling power consumption and producing zero torque.

9. A satellite system having at least one redundant motor system, said redundant motor system comprising:

a set of primary motor windings;

a primary voltage source;

a first set of power switches connecting said primary voltage source to said primary motor windings, each switch in said first set of power switches being connected to a respective primary motor winding in said set of primary motor windings;

a first switch driver connected to said first set of power switches;

a set of redundant motor windings;

a redundant voltage source;

a second set of power switches connecting said redundant voltage source to said set of redundant motor windings, each switch in said second set of power switches being connected to a respective redundant motor winding in said set of redundant motor windings;

a second switch driver connected to said second set of power switches;

a step command source connected to said first and second switch drivers; and a first routing switch for controlling the delivery of step commands from said step command source to said first switch driver;

a second routing switch for controlling the delivery of step commands from said step command source to said second switch driver; and a phase synchronizer connected to said first switch driver and said second switch driver for controlling simultaneous operation of said primary and redundant motor windings.

10. The satellite system as claimed in claim 9 wherein said phase synchronizer is set to establish a relationship between predetermined primary and redundant motor windings such that they operate in phase with each other thereby doubling power consumption and increasing motor torque.

11. The satellite system as claimed in claim 9 wherein said phase synchronizer is set to establish a relationship between predetermined primary and redundant motor windings such that said predetermined motor windings operate in phase quadrature thereby doubling power consumption and increasing motor torque by less than 50%.

12. The satellite system as claimed in claim 9 wherein said phase synchronizer is set to establish a relationship between predetermined primary and redundant motor windings such that said predetermined windings operate out of phase with each other thereby doubling power consumption and producing zero torque.

* * * * *